United States Patent
Jin et al.

(10) Patent No.: US 6,731,442 B2
(45) Date of Patent: May 4, 2004

(54) METHOD AND APPARATUS FOR DETECTING MEDIA DEFECTS

(75) Inventors: Ming Jin, Singapore (SG); Myint Ngwe, Singapore (SG); David Loh, Singapore (SG); Quek Leong Choo, Singapore (SG); Mingyou Hu, Singapore (SG)

(73) Assignee: Seagate Technologies LLC, Scotts Valley, CA (US)

( * ) Notice: Subject to any disclaimer, the term of this patent is extended or adjusted under 35 U.S.C. 154(b) by 28 days.

(21) Appl. No.: 10/066,231

(22) Filed: Jan. 31, 2002

(65) Prior Publication Data

US 2003/0063405 A1 Apr. 3, 2003

Related U.S. Application Data

(60) Provisional application No. 60/326,773, filed on Oct. 2, 2001.

(51) Int. Cl.[7] .............................. G11B 27/36; G11B 5/09
(52) U.S. Cl. ........................... 360/31; 360/53; 714/719; 324/212
(58) Field of Search ............................. 360/53, 31, 25; 714/719; 324/210, 212; G11B 5/09, 20/18

(56) References Cited

U.S. PATENT DOCUMENTS

| | | |
|---|---|---|
| 4,549,295 A | 10/1985 | Purvis |
| 4,746,998 A | 5/1988 | Robinson et al. |
| 4,914,530 A | 4/1990 | Graham et al. |
| 5,563,746 A * | 10/1996 | Bliss ........................... 360/53 |
| 6,043,945 A | 3/2000 | Tsuboi et al. |
| 6,043,946 A * | 3/2000 | Genheimer et al. ........... 360/53 |
| 6,158,027 A | 12/2000 | Bush et al. |
| 6,163,420 A | 12/2000 | Poss |
| 6,282,670 B1 | 8/2001 | Rezaul Islam et al. |
| 6,504,662 B2 * | 1/2003 | Sobey .......................... 360/25 |

FOREIGN PATENT DOCUMENTS

JP       10055628 A   *   2/1998   ........... G11B/20/18

* cited by examiner

*Primary Examiner*—David Hudspeth
*Assistant Examiner*—Dan I Davidson
(74) *Attorney, Agent, or Firm*—Kirk A. Cesari

(57) ABSTRACT

A method is disclosed for detecting defects in a recordable medium such as a hard disc drive based on error energy. The method may include the steps of writing test data to the medium and reading back the test data. The method may also include the steps of computing an error energy based on the square of the difference between the read back data and an ideal version of the test data and comparing the error energy with an energy threshold. The method generates a defect signal when the error energy exceeds the energy threshold. The method may also be used to identify the media defect according to its error energy profile. An apparatus for detecting defects in a recordable medium is also disclosed.

20 Claims, 4 Drawing Sheets

METHOD AND APPARATUS FOR DETECTING MEDIA DEFECTS

CROSS-REFERENCE TO RELATED APPLICATION

This application claims the benefit of U.S. Provisional Application No. 60/326,773, filed Oct. 2, 2001.

FIELD OF THE INVENTION

The present invention relates generally to detecting media defects. More particularly, the present invention relates to a method and apparatus for detecting media defects based on error energy.

BACKGROUND OF THE INVENTION

Before a disc drive leaves the factory it is scanned to determine the location of media defects that will give rise to problems in reading back data. Many of the errors in magnetic recording systems, such as hard disc drives, are reported to come from sporadic amplitude loss of read back signal. Analysis shows that the main causes of the amplitude loss are media asperity, and lumps or nonmagnetic materials attached to the media surface. All of these causes are referred to as a media defect. The defect may cause variation of spacing between the head and media. As the recording density increases, the head-media spacing will decrease accordingly. A small variation of head-media spacing may cause a significant change in the amplitude of read back signals. Usually a media defect may cause detectors to make decision errors, which may result in errors of several bits to hundreds of bits. Advanced signal processing and error correction code techniques may be used when the media defect is not severe. However, if the media defect is so severe that the stored information cannot be recovered reliably, a safe and straightforward method is to avoid storing information in the area associated with the media defect in the future. This is known as a defect scan and is accomplished by the following two steps:

(i) Identify the media defects.
(ii) Map the locations of the media defects onto a defect table.

The more important of the two steps is to identify the media defects. Many methods have been proposed to carry out this identification.

Currently, one of the most widely used defect scan methods is to write a periodic data pattern onto the media. To detect a media defect during a read back operation, a threshold detector is employed to compare equalized read back signals with a pre-selected threshold. During the media defect scan test, different types of data patterns are selected so that they may have different sensitivity to different types of media defect size. A commonly used detect pattern for media defect scan is a 2T pattern, being a sampled and normalized pattern typically in the form (+1, +1, −1, −1). Since the data pattern is periodic and fixed, the amplitude of the equalized read back signal should be substantially constant. In other words, the amplitude should only vary within a small range, depending on the noise level. However, if there is a media defect on the disc, the amplitude may drop significantly. When it is less than the pre-selected threshold, it will trigger the threshold detector to locate the media defect locations and map them onto the defect table.

A disadvantage of the current method of defect scan is that there is a possibility that more areas are mapped out than what is required or that those defects that are shallow are missed out. This in turn may reduce both the drive yield and the drive capacity. Some of the 'bad' locations could be due to many single-bit errors that are correctable by Error Correction Codes (ECC) and are not true defects. An improved method has been proposed to count the total defect number within a window, which can filter out small media defects causing single bit errors. However, all existing methods are based on signal amplitude, and assume that the read back signal suffers from amplitude modulation. The prior art methods work well at relatively low recording densities. However, as recording densities increase, these methods fail to identify those media defects that are shallow and, which are not obvious at low densities. The prior art methods are very sensitive to channel noise. Therefore, there exists a need for a new defect scan method that can identify shallow defects and that is not as sensitive to channel noise.

The present invention provides a solution to this and other problems, and offers other advantages over the prior art.

SUMMARY OF THE INVENTION

The present invention provides a method and apparatus for detecting media defects in a hard disc drive which addresses the above-mentioned problem and is based on error energy.

According to one embodiment of the present invention there is provided a method for detecting defects in a recordable, the method including the steps of computing an error energy and determining if a defect exists based on the error energy.

According to another embodiment of the present invention there is provided an apparatus for detecting defects in a recordable medium, the apparatus including means for computing an error energy and means for determining if a defect exists based on the error energy.

In yet another embodiment of the present invention there is provided a program storage device readable by a computer system tangibly embodying a program of instructions executable by a computer system to perform an error detection method, comprising the steps of computing an error energy and determining if a defect exists based on the error energy. In addition, the invention also can be implemented as a disc drive storage system itself.

These and various other features as well as advantages which characterize the present invention will be apparent upon reading of the following detailed description and review of the associated drawings.

BRIEF DESCRIPTION OF THE DRAWINGS

A preferred embodiment of the present invention will now be described with reference to the accompanying drawings wherein:

FIG. 2-1 shows one form of apparatus for detecting media defects in a hard disc drive according to the present invention;

FIG. 2—2 shows another form of apparatus for detecting media defects in a hard disc drive according to the present invention;

DETAILED DESCRIPTION

Figure 1:
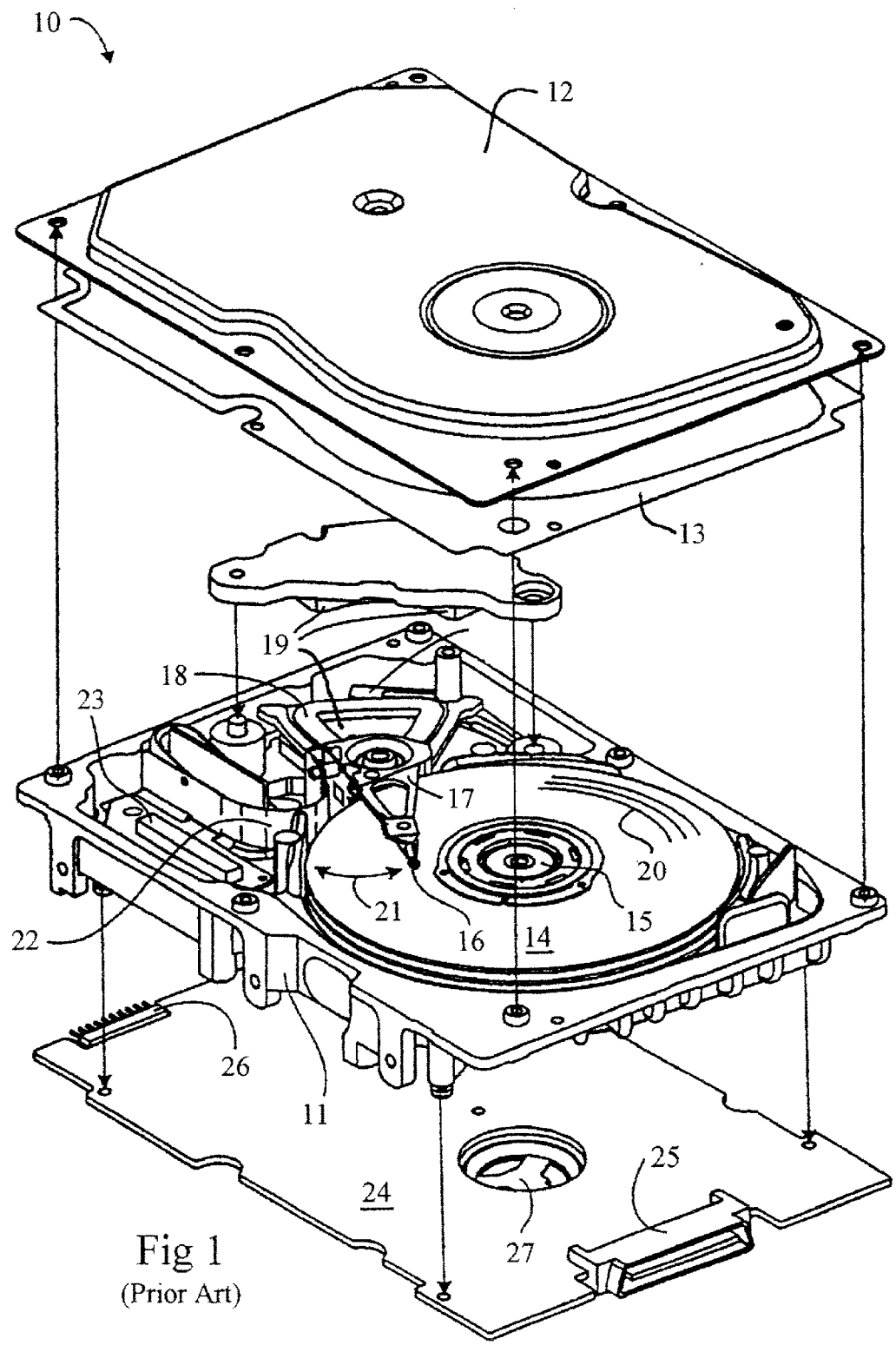
FIG. 1 shows an exploded view of a hard disc drive.

FIG. 1 shows a disc drive in an exploded view. Briefly, the disc drive 10 includes a housing base 11 and a top cover 12, which engage a gasket 13 to form a sealed housing that maintains a clean environment therein. A plurality of discs 14 is mounted for rotation on a spindle motor hub 15. A plurality of transducer heads 16 is mounted to an actuator body 17. The actuator body 17 is adapted for pivotal motion under control of a voice coil motor (VCM) including a voice coil 18 and magnets 19 to controllably move a head 16 to a desired track 20 along an arcuate path 21. Signals used to control the VCM and the heads 16 pass via a flex circuit 22 and a connector 23 to and from electronic circuitry on controller board 24. The controller board 24 includes a controller (not shown), a channel interface 25, a serial port connector 26, and a spindle connector 27.

Figures 1, 2:
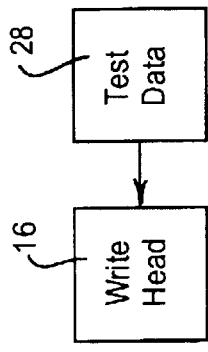
Figure 2:
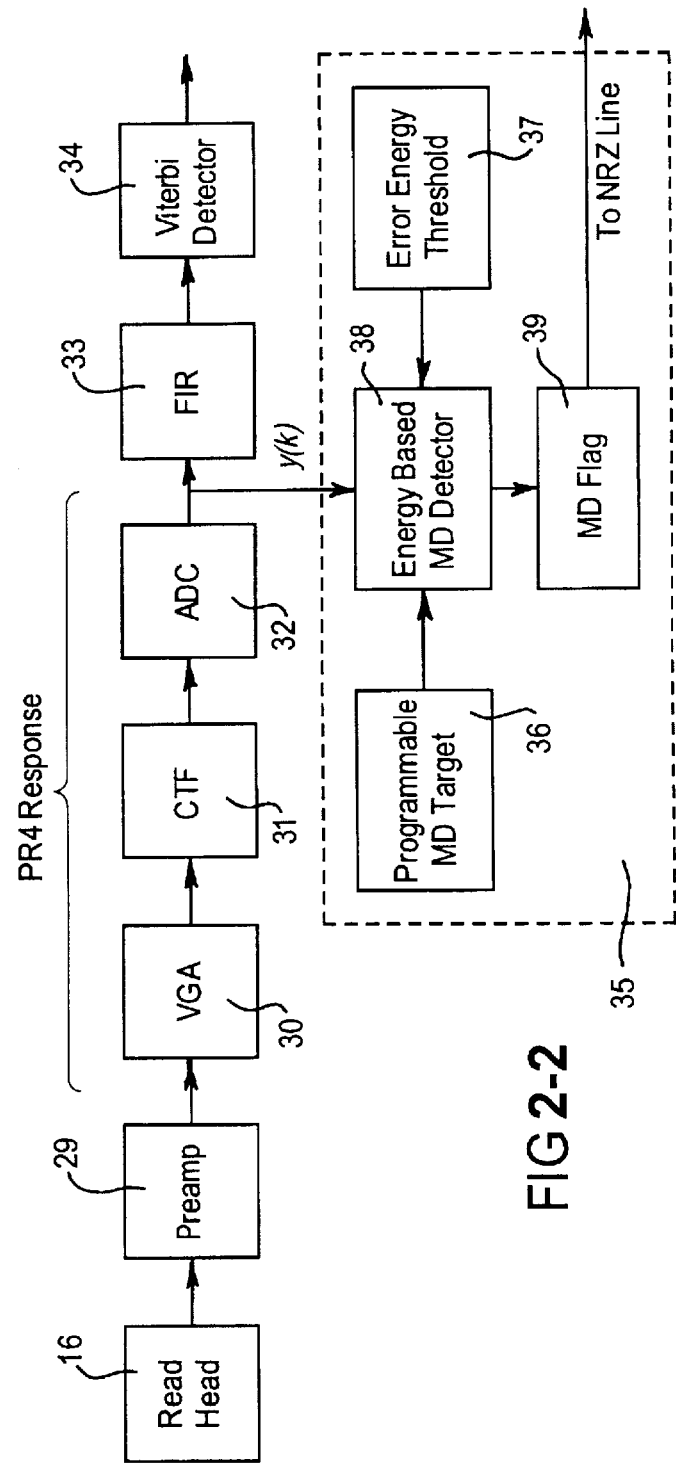
Figure 3:
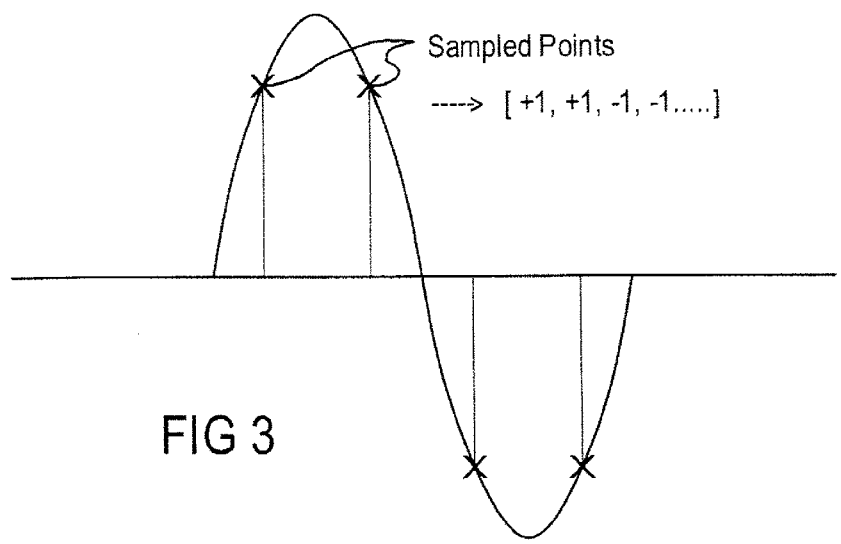
FIG. 3 shows one form of test data signal which is written and read.
Figure 6:
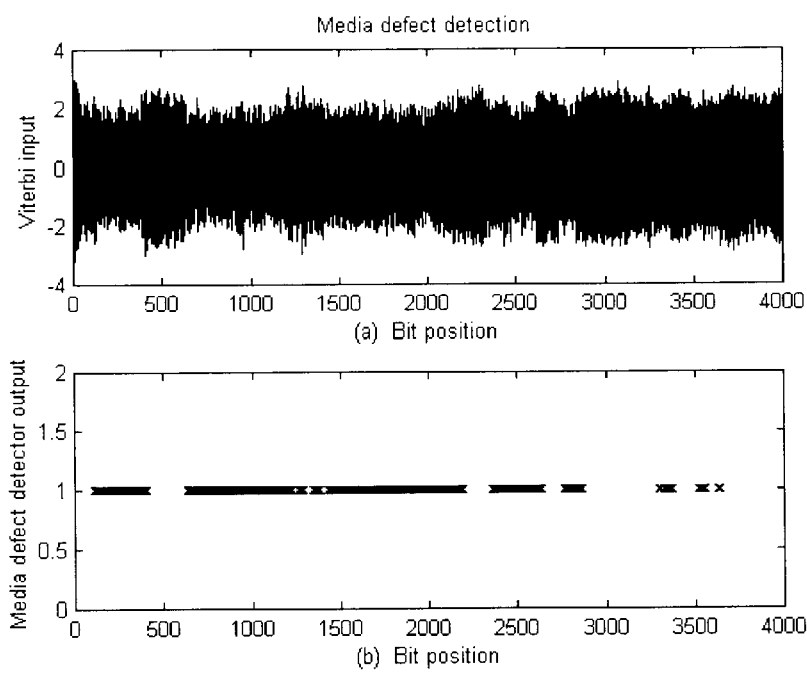
FIG. 6 shows a media defect detector output.

FIG. 2-1 shows a read/write head 16 operably connected to a source 28 of test data. The test data may comprise a 2T pattern in the form of (+1, +1, −1, −1) as shown in FIG. 3. The 2T pattern is simply a sinusoid. In actual fact the form of (+1, +1, −1, −1) is only achievable with PR4 (Partial Response 4$^{th}$ order) where the sampling is done in this way. As can be seen in FIG. 6(a), the pattern can also be in the form (+2, +2, −2, −2).

FIG. 2—2 shows apparatus including a preamplifier 29 operably connected to read/write head 16. The analog output from preamplifier 29 passes to variable gain amplifier (VGA) 30 and continuous time filter (CTF) 31 that may be an analog low pass filter. The signal then passes to analog to digital converter (ADC) 32 where it is converted to a digital signal.

The digital signal from ADC converter 32 passes to finite impulse response (FIR) filter 33 which is usually a digital all zeros filter used to equalize the sampled signal into its target response of read head 16. The signal then passes to Viterbi detector 34. Detector 34 incorporates a trellis structured decision making process which tracks all possible "paths" (with respect to the coding scheme used) that the digital signal (data) can make. In the process, very unlikely codes/paths are eliminated and at the end of the trellis, a decision is made that determines the maximum likelihood code with respect to what it receives. It will then output the maximum likelihood output code (data) to the data lines (not shown) where it is given to the user.

The digital signal from ADC converter 32 also passes to media defect detector 35. Media defect detector 35 includes Programmable Media Defect Target Module 36 which computes an error energy $E_{ideal}$ according to equation (1). An error energy threshold ($E_0$) is initialized in module 37. Energy based media defect detector module 38 compares the error energy $E_{ideal}$ from module 36 with the error energy threshold stored in module 37. If the computed Error Energy is greater than the Error Energy threshold module 38 outputs a logical "1" signal to Medial Defect flag module 39. Module 39 triggers a "Media Defect Event". The defect events are then mapped onto a defect table associated with the hard disc drive.

Figure 4:
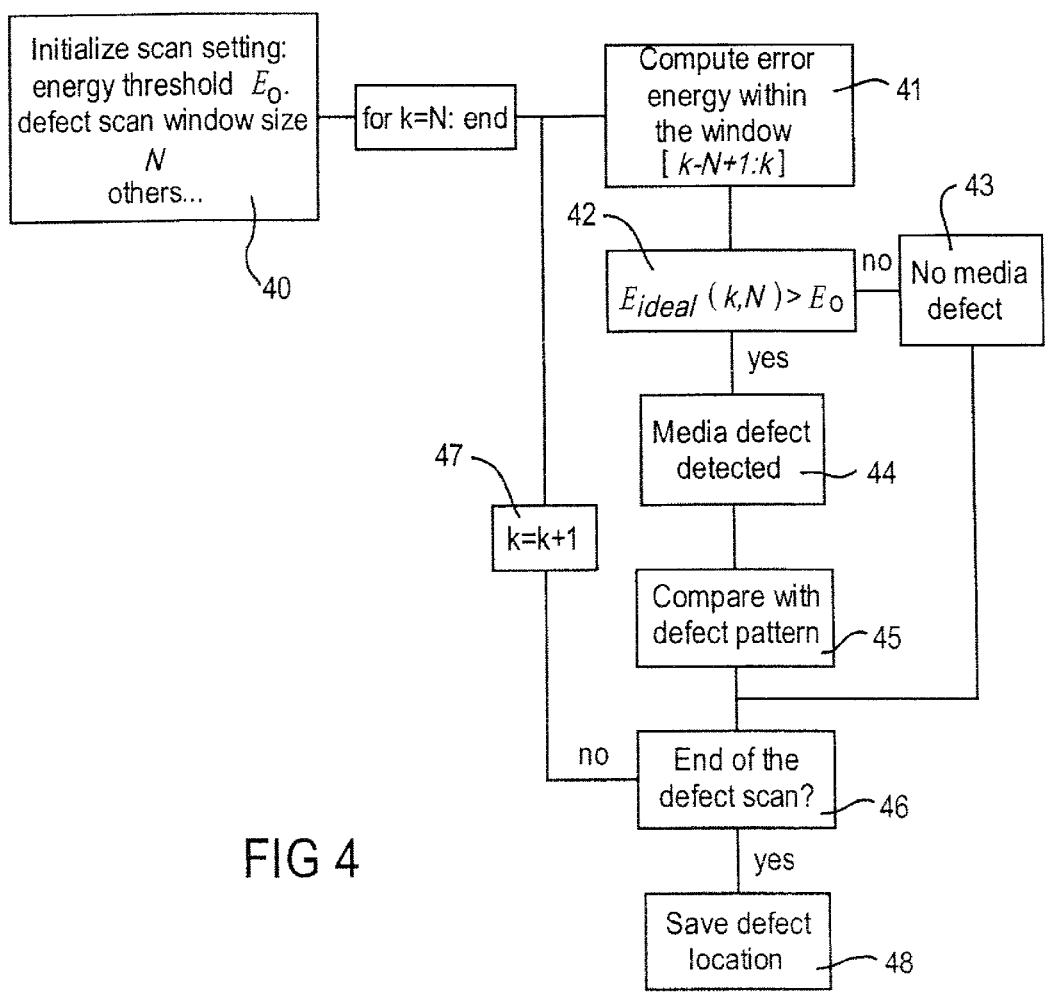
FIG. 4 shows a flow chart of a defect scan algorithm.

FIG. 4 shows a flow chart of the defect scan algorithm incorporating the method of the present invention based on Error Energy. The first step (40) in the algorithm is to initialize the scan by selecting the energy threshold $E_0$ and the defect scan window size N etc. The next step (41) is to compute the Error Energy $E_{ideal}$ (k,N) according to equation (1) within the window [k−(N−1):k], where k denotes a time index reference. The next step (42) is to compare the Error Energy $E_{ideal}$ to the selected threshold value $E_0$. If the computed Error Energy is not greater than the threshold value $E_0$ it is assumed that no media defect is detected (step 43) in the window defined by the current time index (value of k). If the computed Error Energy is greater than the threshold value $E_0$ it is assumed that a media defect is detected (step 44). The media defect is compared (step 45) with a stored library of defects having a similar Error Energy profile. This enables the defect to be catalogued according to its type. If the value of the time index k is less than N (step 46) it is incremented by one (step 47) and steps 41 to 46 of the algorithm are repeated. The steps are repeated until the time index k=N. The defect locations are stored (step 48) based on the values of the time index k when the defects were detected. A code representing the type of media defect determined in step 45 is also stored with each defect location.

The proposed defect scan method is based on the theory of maximum likelihood (ML) by comparing the equalized read back signal with the ideal signal within a programmable sliding window. Denote the equalized read back signal (assume that the read back signal is equalized to a class IV partial response (PR4)) as y(k) at instant k, and the noiseless ideal signal as Yideal (k). If there is no media defect on the disc, y(k)=Yideal(k)+n(k), where n(k) is an equalized random noise variable. Note that the noise variable n(k) is fully characterized by its zero mean and its variance $\sigma_n^2$, which is defined by the channel signal-to-noise ratio (SNR). Define the error energy $E_{ideal}(k,N)$ between y(k) and $y_{ideal}(k)$ within consecutive time instants k, k+1, . . . , k+N−I, as follows:

$$E_{ideal}(k, N) = \frac{1}{N}\sum_{i=0}^{N-1} (y(k-i) - y_{ideal}(k-i))^2 \qquad (1)$$

If the media is defect-free, $y_{ideal}(k)$ is a function a channel SNR and usually very small. However, if y(k) is corrupted by a media defect, $E_{ideal}(k,N)$ is most likely larger than that in the defect-free case. Based on this observation, $E_{ideal}((k, N)$ may be compared with a pre-selected energy threshold $E_0$. If $E_{ideal}(k, N) > E_0$, then a media defect is identified, and the corresponding time index k and N may be used to locate the position of the media defect.

Based on a statistical analysis of experimental results, a good knowledge of media defects may be obtained, including their lengths, shapes, amplitudes, occurrence probabilities, etc. After obtaining this knowledge, a set of programmable media defect targets may be defined. Each target may be referred to as $\{T_j(0), T_j(1), \ldots, T_j(N_j)\}$ where $T_j(i)$ is the amplitude of the j-th media defect at instant i, and $N_j$ is the length of the j-th media defect. The error energy between the equalized read back signal y(k) and a media defect target $T_j$ may be computed as follows:

$$E_{T_j}(k, N_j) = \frac{1}{N_j}\sum_{i=0}^{N_j-1} (y(k-i) - T_j(k-i))^2 \qquad (2)$$

Comparing the two error energies given by equations (1) and (2), if $E_{ideal}(k,N) > \min\{E_{T_j}(k,N_j)\}$, one may not only identify the media defect, but also know what kind of media defect it is. By collecting occurrence probabilities for different media defects, a statistical data base or library of media defects may be obtained. This Information may be useful to a media design engineer to evaluate and improve media performance.

Figure 5:
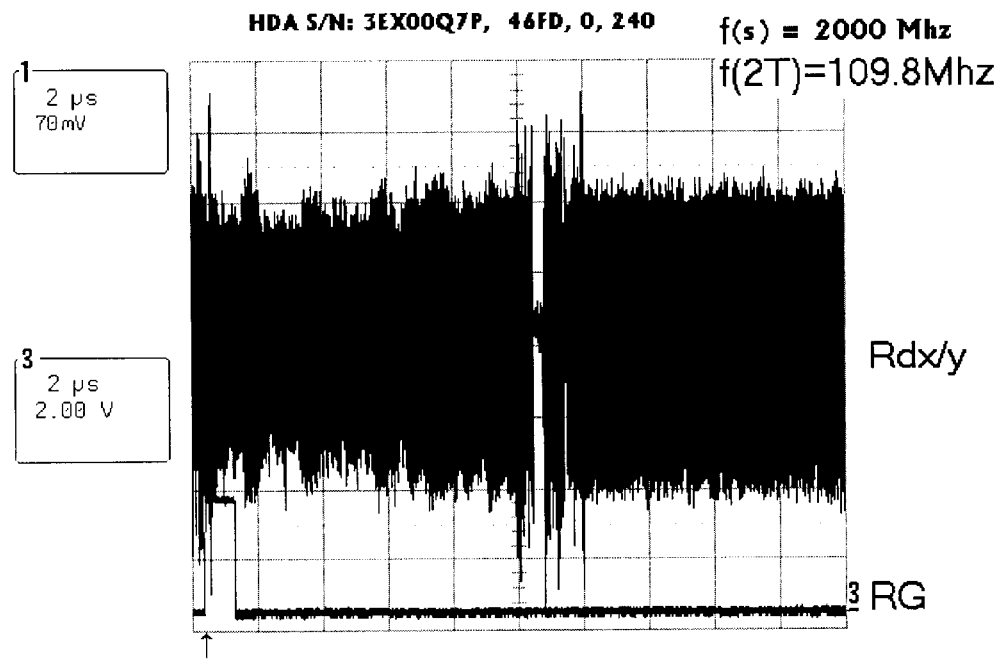
FIG. 5 shows a captured read back signal for a U6 hard disc drive.

FIG. 5 shows a typical read back signal from a Hard Disc Drive obtained by means of a Disc Drive Analyzer. The amplitude of the read back signal in the first sector is reduced due to a media defect. When the read back signal in the first sector is passed through a 10-tap FIR equalizer (refer modules 31, 32 in FIG. 1), a PR4 equalized output signal y(t) is obtained.

The equalized output signal y(t) is plotted in FIG. 6(a). Note that the noiseless version of y(t) without a media defect is in the form of { . . . +2, +2, −2, −2, . . . }. If a media defect is identified by the media defect detector based on the error energy criteria (module 35 in FIG. 2—2), a "1" is triggered at the media defect detector output (module 38 in FIG. 2—2). The "x" marks in FIG. 6(b) show bit positions associated with the identified media defect. The locations of media defect are then mapped onto a defect table.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the media detection circuit while maintaining substantially the same functionality without departing from the scope and spirit of the present invention. In addition, although the preferred embodiment described herein is directed to detecting media defects for a disc drive system, it will be appreciated by those skilled in the art that the teachings of the present invention can be applied to other systems, like removable magnetic storage systems or other optical drive systems which may include DVDs, CDs, CD-Rs, and CD-RWs, without departing from the scope and spirit of the present invention.

What is claimed is:

1. A method for detecting defects in a recordable medium, comprising the steps of:
   writing test data to the medium;
   reading back the test data from the medium;
   computing an error energy based on the square of the difference between the read back test data and an ideal version of the test data;
   determining if a defect exists based on the error energy.

2. The method of claim 1 wherein the determining phase comprises the steps of:
   comparing the error energy with an energy threshold; and
   generating a defect signal when the error energy exceeds the energy threshold.

3. The method of claim 1 wherein the error energy is computed according to:

$$E_{ideal}(k, N) = \frac{1}{N} \sum_{i=0}^{N-1} (y(k-i) - y_{ideal}(k-i))^2$$

wherein y(k) is the read back signal at instant k, $y_{ideal}(k)$ is the noiseless ideal signal and N is an integer.

4. The method of claim 1 wherein the error energy associated with the media defect characterizes the media defect according to at least one physical variable.

5. The method of claim 4 wherein the at least one physical variable is selected from the group consisting of length, shape, and amplitude.

6. The method of claim 2 wherein error energy values associated with a range of media defects are stored in a library file.

7. The method of claim 6 wherein the computed error energy is compared to the error energy values stored in the library file to facilitate identification of a defect.

8. A method according to claim 1 wherein a measure associated with the location of a defect is stored in a memory file.

9. An apparatus for detecting defects in a recordable medium, said apparatus including:
   means for writing test data to the medium;
   means for reading back the test data from the medium;
   means for computing an error energy based on the square of the difference between the read back test data and an ideal version of the test data;
   means for determining if a defect exists based on the error energy.

10. The apparatus of claim 9 wherein the means for determining if a defect exists comprises:
    means for comparing the error energy with an energy threshold; and
    means for generating a defect signal when the error energy exceeds the energy threshold.

11. The apparatus of claim 9 wherein the error energy is computed according to:

$$E_{ideal}(k, N) = \frac{1}{N} \sum_{i=0}^{N-1} (y(k-i) - y_{ideal}(k-i))^2$$

where y(k) is the read back signal at instant k, Yideal(k) is the noiseless ideal signal and N is an integer.

12. The apparatus of claim 9 wherein the error energy associated with a media defect characterizes a media defect according to at least one physical variable.

13. The apparatus of claim 12 wherein the at least one physical variable is selected from the group consisting of length, shape, and amplitude.

14. The apparatus of claim 9 including means for storing in a library file error energy values associated with a range of media defects.

15. The apparatus of claim 14 including means for comparing the computed error energy to said values stored in the library file to facilitate identification of a defect.

16. The apparatus of claim 10 including means for storing in a memory file a measure associated with the location of a defect.

17. A program storage device readable by a computer system tangibly embodying a program of instructions executable by a computer system to perform an error detection method, the method comprising steps of:
    writing test data to the medium;
    reading back the test data from the medium;
    computing an error energy based on the square of the difference between the read back test data and an ideal version of the test data;
    determining if a defect exists based on the error energy.

18. The program storage device of claim 17 wherein the determining if a defect exists step further comprises steps of:
    comparing the error energy with an energy threshold; and
    generating a defect signal when the error energy exceeds the energy threshold.

19. A data storage system, comprising:
    a transducer configured to read and write data from a data storage medium;

a controller operably connected to the transducer, the controller configured to write test data to the data storage medium;

read back the test data from the data storage medium;

compute an error energy based on the square of the difference between the read back test data and an ideal version of the test data; and determine if a defect exists based on the error energy.

20. The data storage system of claim 19 wherein the controller is further configured to:

compare the error energy with an energy threshold; and generate a defect signal when the error energy exceeds the energy threshold.

* * * * *